(12) United States Patent
Requa (10) Patent No.: US 9,896,872 B1
(45) Date of Patent: Feb. 20, 2018

(54) AUTO CLOSING DEVICE FOR RV SCREEN DOORS SYSTEM

(71) Applicant: Dusty Requa, Hemet, CA (US)

(72) Inventor: Dusty Requa, Hemet, CA (US)

(*) Notice: Subject to any disclaimer, the term of this patent is extended or adjusted under 35 U.S.C. 154(b) by 0 days.

(21) Appl. No.: 14/813,120

(22) Filed: Jul. 30, 2015

Related U.S. Application Data (60) Provisional application No. 62/031,381, filed on Jul. 31, 2014.

(51) Int. Cl.
*E05F 1/00* (2006.01)
*E05F 1/16* (2006.01)
*B60P 3/36* (2006.01)
*E06B 9/52* (2006.01)

(52) U.S. Cl.
CPC ...... *E05F 1/16* (2013.01); *B60P 3/36* (2013.01); *E06B 9/52* (2013.01)

(58) Field of Classification Search
CPC ..... Y10T 16/56; Y10T 16/593; Y10T 16/597; Y10T 24/31; Y10T 24/314; Y10T 24/316; Y10T 24/318; Y10T 24/3416; Y10T 24/3419; Y10T 24/47; Y10T 24/4755; B60P 7/0823; B60P 3/36; A63B 21/0552; A63B 21/0555; A63B 21/0557; F16B 45/00; F16G 11/143; E05F 1/16; E06B 9/52

See application file for complete search history.

(56) References Cited

U.S. PATENT DOCUMENTS

| | | | | |
|---|---|---|---|---|
| 400,041 A | * | 3/1889 | Bender et al. ............ | E05F 1/10 16/74 |
| 1,524,765 A | * | 2/1925 | Van Arnhem ............ | E05F 1/10 101/103 |
| 1,691,810 A | * | 11/1928 | Itzerott ................. | A61F 15/006 24/301 |
| 2,660,349 A | * | 11/1953 | Bernau ................... | B60R 5/006 224/311 |
| 2,705,337 A | * | 4/1955 | Langdon ................. | E05F 1/10 16/66 |
| 2,808,675 A | * | 10/1957 | Sharp ..................... | A01K 87/06 24/265 R |
| 3,928,889 A | * | 12/1975 | Wartian .................. | E05C 17/36 16/74 |
| 4,656,781 A | * | 4/1987 | Niekrasz .................. | E05F 1/16 16/71 |
| 4,832,391 A | * | 5/1989 | Moell ..................... | B66C 1/625 294/74 |

(Continued)

*Primary Examiner* — Chuck Mah
(74) *Attorney, Agent, or Firm* — RG Patent Consulting, LLC; Rachel Gilboy (57) ABSTRACT

A tool for enabling opening and closing a screen door of a recreation vehicle system includes a strap member assembly having a first end including a first flat-hooked member; a deformable strap having a proximate end, and a distal end; and a second end having a second flat-hooked member. The tool for enabling opening and closing a screen door of a recreation vehicle system includes the strap member assembly. When used the strap member assembly does not impede normal movement of screens of the recreation vehicle while simultaneously enabling manipulation of the screen door between an open position to allow ingress and a closed position to prevent bugs and debris from entering into the recreation vehicle, as desired.

9 Claims, 5 Drawing Sheets

(56) References Cited

U.S. PATENT DOCUMENTS

| | | | | |
|---|---|---|---|---|
| 5,417,273 A * | 5/1995 | Bamonte | B60J 1/08 160/368.1 |
| 5,676,178 A * | 10/1997 | Ehnimb | D03D 3/06 139/384 R |
| 5,720,080 A * | 2/1998 | Rose | E05F 1/16 16/74 |
| 5,989,137 A * | 11/1999 | Krueger | A63B 69/0091 473/423 |
| 6,014,794 A | 1/2000 | McCoy | |
| 6,345,416 B1 * | 2/2002 | Vollmar | E05B 85/10 16/24 |
| 6,863,249 B1 * | 3/2005 | Alvord | B60R 9/02 248/208 |
| 7,228,600 B1 | 6/2007 | Selby et al. | |
| 7,712,195 B1 | 5/2010 | Selby | |
| 7,739,775 B2 * | 6/2010 | Shimanski | B60P 7/0807 24/265 H |
| 2005/0050695 A1 * | 3/2005 | Mackey | B62J 7/08 24/300 |
| 2005/0059537 A1 * | 3/2005 | Hull | A63B 21/0004 482/124 |
| 2005/0097710 A1 * | 5/2005 | Johnson | A47J 36/06 24/300 |
| 2005/0115654 A1 * | 6/2005 | Badham | B60C 27/12 152/231 |
| 2005/0173483 A1 * | 8/2005 | Ravikumar | B60R 7/12 224/483 |
| 2012/0148363 A1 * | 6/2012 | Summer | B26D 3/001 410/101 |
| 2013/0305494 A1 * | 11/2013 | Handwerger | A63B 71/0045 24/302 |
| 2014/0128230 A1 * | 5/2014 | Burcham | A63B 21/00185 482/123 |
| 2014/0259550 A1 * | 9/2014 | Breeden | F16B 45/00 24/302 |
| 2015/0013116 A1 * | 1/2015 | Lindberg | B60P 7/0869 24/265 H |

* cited by examiner

AUTO CLOSING DEVICE FOR RV SCREEN DOORS SYSTEM

CROSS-REFERENCE TO RELATED APPLICATION

The present application is related to and claims priority from prior provisional application Ser. No. 62/031,381, filed Jul. 31, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of stretchable bands with hooks and more specifically relates to a fastening tool for enabling unobstructed opening and closing a screen door of a recreation vehicle system.

2. Description of the Related Art

America's love affair with the automobile is more than a hundred years old, and as strong as ever; but our love affair with the open road, with travel and adventure, is older still. As Americans, ours is a history of collective restlessness. From its colonial beginnings, this country was settled by the footloose, the wanderers, the dreamers and outcasts and wild-eyed prophets, the people who left the Old World behind to cross an ocean and build the New.

Today we can explore the continent in climate-controlled comfort, yet still imagine the hardships of our ancestors. We can retrace the routes of the wagon trains across oceanic expanses of prairie; we can honor the men who laid steel rails from Atlantic to Pacific; we can cross in easy comfort the mountains that claimed the Donner Party; we can look west from the Marin Headlands and imagine the square-rigged ships that brought the 49'ers through the Golden Gate in search of Sierra gold.

Still, even a deluxe RV or travel trailer, a rolling palace equipped with all the comforts of home, is subject to certain minor annoyances. Among these is the fact that an RV's screen door is mounted on the inside of the outer door, and because the screen door must make room for the closing of the exterior door, it has a sliding panel that opens to accommodate the exterior door's knob, and closes (when the outer door is opened) to keep insects out of the RV. The screen door works well as a barrier but only if one remembers to close the slide-panel every time.

Various attempts have been made to solve problems found in multipurpose bands having a hook on each end art. Among these are found in: U.S. Pat. No. 7,712,195 to Ricky W. Selby; U.S. Pat. No. 7,228,600 to Robert Lee Gast; and U.S. Pat. No. 6,014,794 to Patrick M. Mc Coy. This prior art is representative of multipurpose bands having a hook on each end. None of the above inventions and patents, taken either singly or in combination, is seen to describe the invention as claimed.

Ideally, a tool for enabling opening and closing a screen door of a recreation vehicle system should be user-friendly and safe in-use and, yet may operate reliably and be manufactured at a modest expense. Thus, a need exists for a tool for enabling opening and closing a screen door of a recreation vehicle system which does not impede normal movement of screens of the recreation vehicle while simultaneously enabling manipulation of the screen door between an open position to allow ingress and a closed position to prevent bugs and debris from entering into the recreation vehicle, as desired and to avoid the above mentioned problems.

BRIEF SUMMARY OF THE INVENTION

In view of the foregoing disadvantages inherent in the known multipurpose bands having a hook on each end device art, the present invention provides a tool for enabling opening and closing a screen door of a recreation vehicle system (entitled 'Auto Closing Device For RV Screen Doors System'). The general purpose of the present invention, which will be described subsequently in greater detail is to provide a tool for enabling such unobstructed opening and closing of a screen door of a recreation vehicle yet not interfering with other components.

A tool for enabling opening and closing a screen door of a recreation vehicle system is disclosed herein, in a preferred embodiment, comprising: a strap member assembly having a first end including a first flat-hooked member; a deformable strap having a proximate end, and a distal end; and a second end having a second flat-hooked member. The tool for enabling opening and closing a screen door of a recreation vehicle system comprises the strap member assembly. The parameters of strap member assembly are defined by the first end, and the second end, the first flat-hooked member; the deformable strap and the second flat-hooked member located in a series relationship.

The strap member assembly is structured and arranged to allow unobstructed opening of the slide-panel on a screen door of the recreation vehicle and when in tension provides that the screen door is able to be automatically closed when not held open. When used, the strap member assembly does not impede normal movement of screens of the recreation vehicle while simultaneously enabling manipulation of the screen door between an open position to allow ingress and a closed position to prevent bugs and debris from entering into the recreation vehicle, as desired.

The first flat-hooked member is located on the first end being coupled to the proximate end of the deformable strap. The first flat-hooked member is structured and arranged to be unobstructively hooked to a bottom left corner of a screen door access panel of the recreation vehicle just above a slide channel. The first flat-hooked member preferably comprises ferrous or non-ferrous material for strength, durability and weather-resistant properties. The first flat-hooked member is approximately 1-inch in length to provide a sufficient holding means. The first flat-hooked member is substantially V-shaped and comprises an apex point. The apex point on the first flat-hooked member forms an acute angle relative to the deformable strap. The first flat-hooked member is structured and arranged to slide freely on the access panel of the recreation vehicle just above said slide channel when sliding between the open condition and the closed condition.

The deformable strap preferably comprises a rubber band for high tensile strength and deformability from tension back to compression. The deformable strap may be flat thereby not impeding the opening and the closing of the screen door. The deformable strap is approximately 5/16-inches in width so as to not impede manipulation of the screen door from the open condition to the closed condition. The deformable strap is in compression when the screen door is in the closed condition. The deformable strap is approximately 1-inch in length when in the compression so as to not impede manipulation of the screen door from the open condition to the closed condition. The deformable strap is in extension and extends to double a resting length of the deformable strap when the screen door is in the open condition.

The second flat-hooked member is located on the second end being coupled to the distal end of the deformable strap. The second flat-hooked member is able to be unobstructively hooked to an outside edge of a frame on the screen door. The second flat-hooked member comprises ferrous or non-ferrous material for providing sufficient strength, durability and weather-resistance. The second flat-hooked member is approximately 3/16-inch in length and is substantially V-shaped also comprising an acute apex point relative to the deformable strap. The second flat-hooked member is structured and arranged to slide freely on the outside edge of the frame of the screen door of the recreation vehicle when sliding between said open condition and the closed condition.

A kit is also embodied herein for the tool for enabling opening and closing a screen door of a recreation vehicle system comprising a plurality of strap member assemblies in various colors, materials, and designs; and a set of user-instructions.

A method of using a tool for enabling opening and closing a screen door of a recreation vehicle system is disclosed herein comprising the steps of: choosing a strap member assembly in a user-preferred color and material; hooking a first flat-hooked member to a bottom left corner of a screen door access panel of the recreation vehicle just above a slide channel, the first flat-hooked member able to let a screen pass thereby; hooking a second flat-hooked member to an outside edge of a frame on the screen door, the second flat-hooked member able to let a screen pass thereby; opening the screen door; and automatically closing the screen door once a user has entered or exited from the recreation vehicle. The method further comprising the step of unhooking the first flat-hooked member and the second flat-hooked member of the strap assembly from the screen door of the recreation vehicle for future use.

The present invention holds significant improvements and serves as a tool for enabling opening and closing a screen door of a recreation vehicle system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention tool for enabling opening and closing a screen door of a recreation vehicle system (entitled Auto Closing Device For RV Screen Doors System') constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to multipurpose bands having a hook on each end and more particularly to a tool for enabling opening and closing a screen door of a recreation vehicle system (entitled Auto Closing Device For RV Screen Doors System') for enabling opening and closing a screen door of a recreation vehicle system which does not impede normal movement of screens of the recreation vehicle while simultaneously enabling manipulation of the screen door between an open position to allow ingress and a closed position to prevent bugs and debris from entering into the recreation vehicle, as desired.

Generally speaking, the Auto Closing Device for RV Screen Doors System comprises a specially designed tool that performs a valuable and thus-far overlooked function.

The Auto Closing Device for RV Screen Doors System preferably comprises an elastic cord or flat rubber band, 5/16-inch in width and 6 inches in length, with a flat plastic or metal hook, 1 inch in length, at a first end and 3/16-inch at a second end. The elastic cord or band may be hooked to the screen-door frame at one end and the back edge of the slide-panel at the other, such that the slide-panel may be easily opened against the resistance of the band. Then, when the panel is released, the bands stored elastic tension will rapidly pull it closed. The 'flat' anchoring hooks will preferably permit the panel to slide freely in its channels, and unlike the hooks of standard bungee cords, which might otherwise be tempting alternatives in this application the flat hooks will pose no interference to the opening and closing of the screen door.

For a tiny investment of a few dollars, the Auto Closing Device for RV Screen Doors System may give RV enthusiasts a tremendous return in convenience and simplicity. A snap to install and use, eminently affordable, with nothing to assemble and no moving parts to break, the Auto Closing Device for RV Screen Doors System is a simple invention that may meet a need shared by millions of RV owners. This essential RV accessory may find a wide and enthusiastic reception in the recreational-vehicle markets of America and the world.

Referring now to the drawings by numerals of reference there is shown in FIGS. 1-4 perspective views illustrating strap member assembly 102 of tool for enabling opening and closing a screen door of a recreation vehicle system 100 according to an embodiment of the present invention.

Tool for enabling opening and closing a screen door of a recreation vehicle system 100 comprises: strap member assembly 102 having first end 110 including first flat-hooked member 120; deformable strap 130 having proximate end 140, and distal end 150; and second end 160 having second flat-hooked member 170. Tool for enabling opening and closing a screen door of a recreation vehicle system 100 preferably comprises strap member assembly 102. The parameters of strap member assembly 102 are defined by first end 110, and second end 160, first flat-hooked member 120, deformable strap 130 and second flat-hooked member 170 located in a series relationship.

Figure 1:
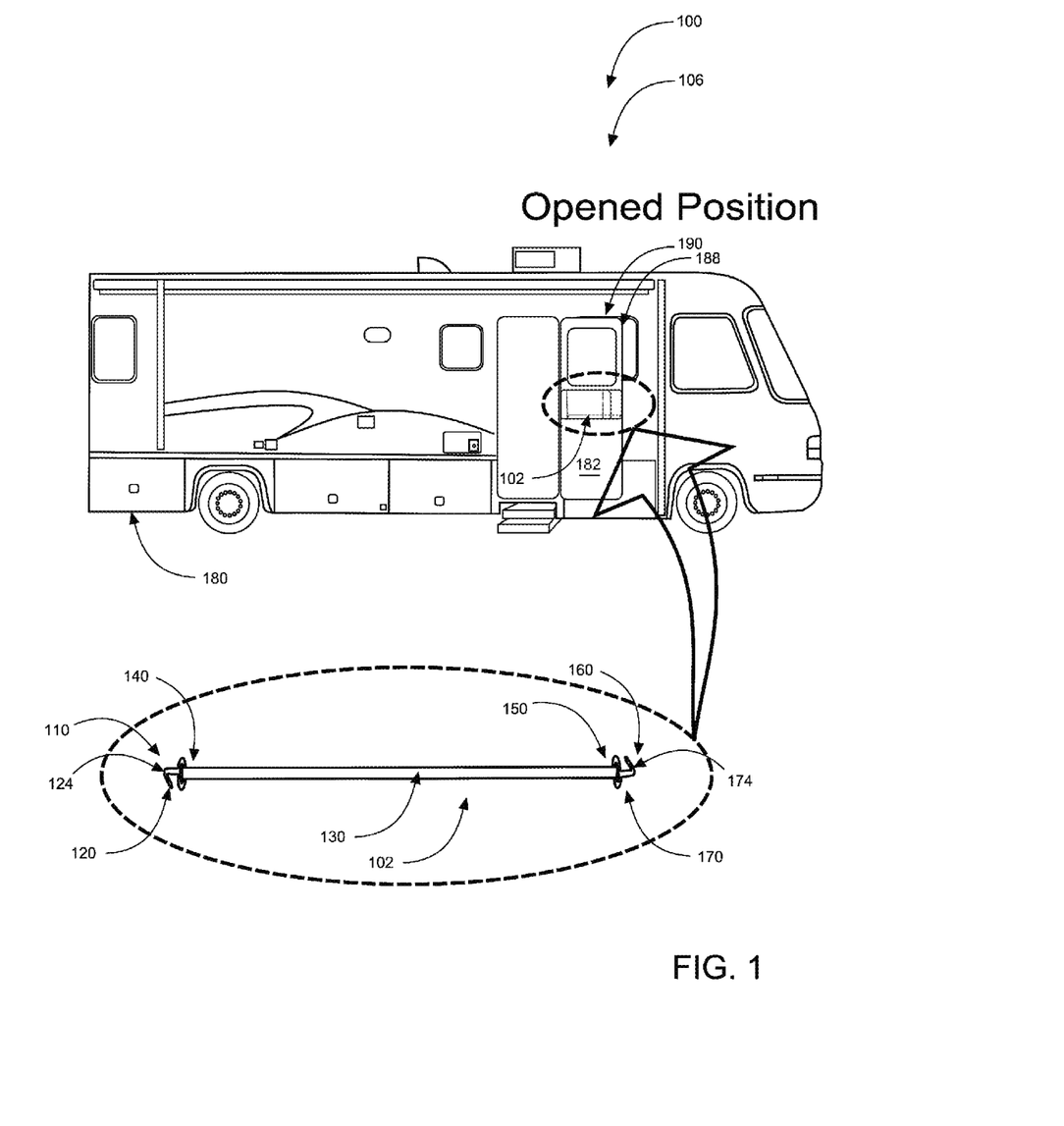
FIG. 1 shows a front perspective view illustrating a tool for enabling opening and closing a screen door of a recreation vehicle system in an 'open' condition according to an embodiment of the present invention.
Figure 2:
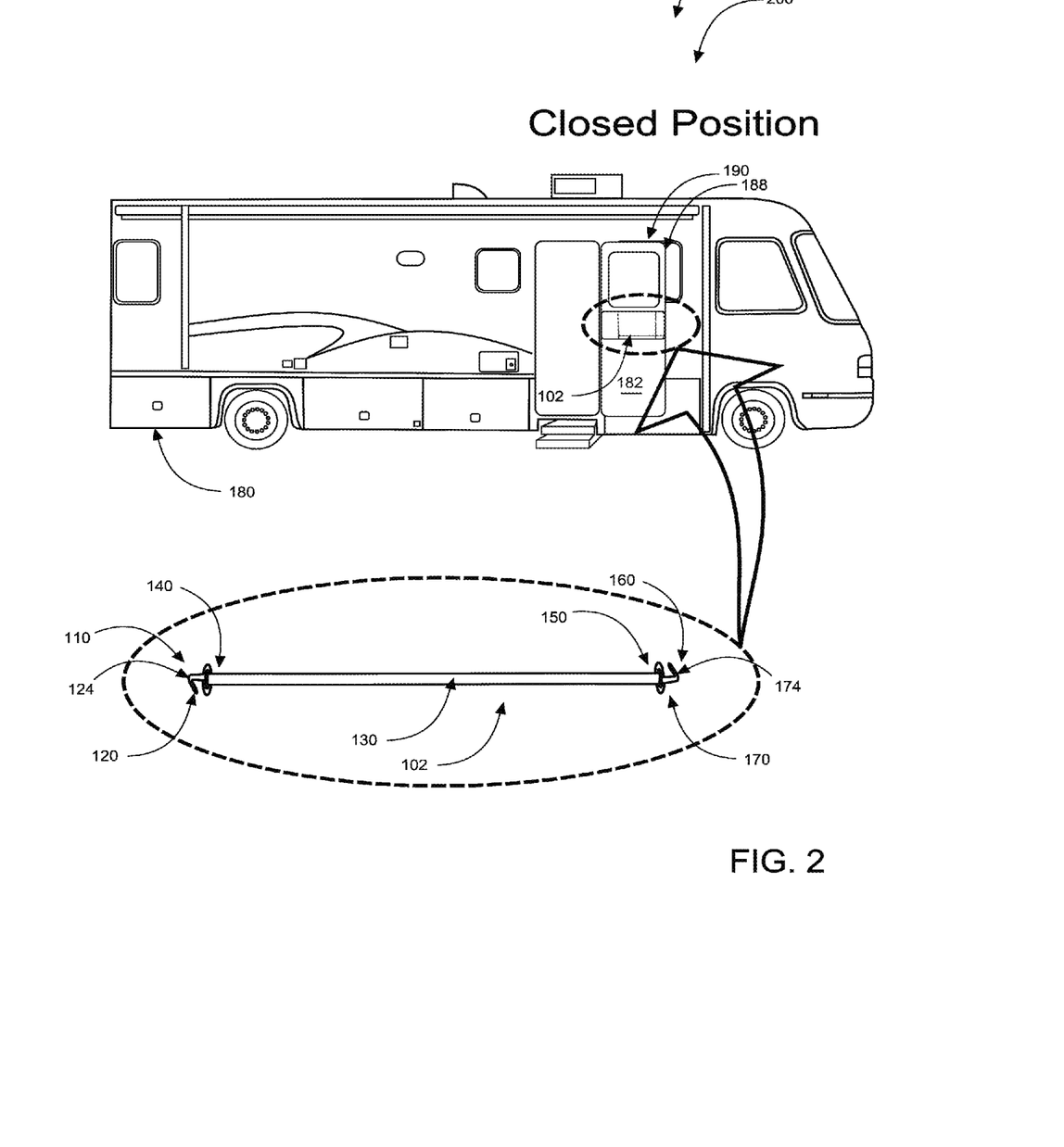
FIG. 2 shows a front perspective view illustrating a tool for enabling opening and closing a screen door of a recreation vehicle system in a 'closed' condition according to an embodiment of the present invention.
Figure 3:
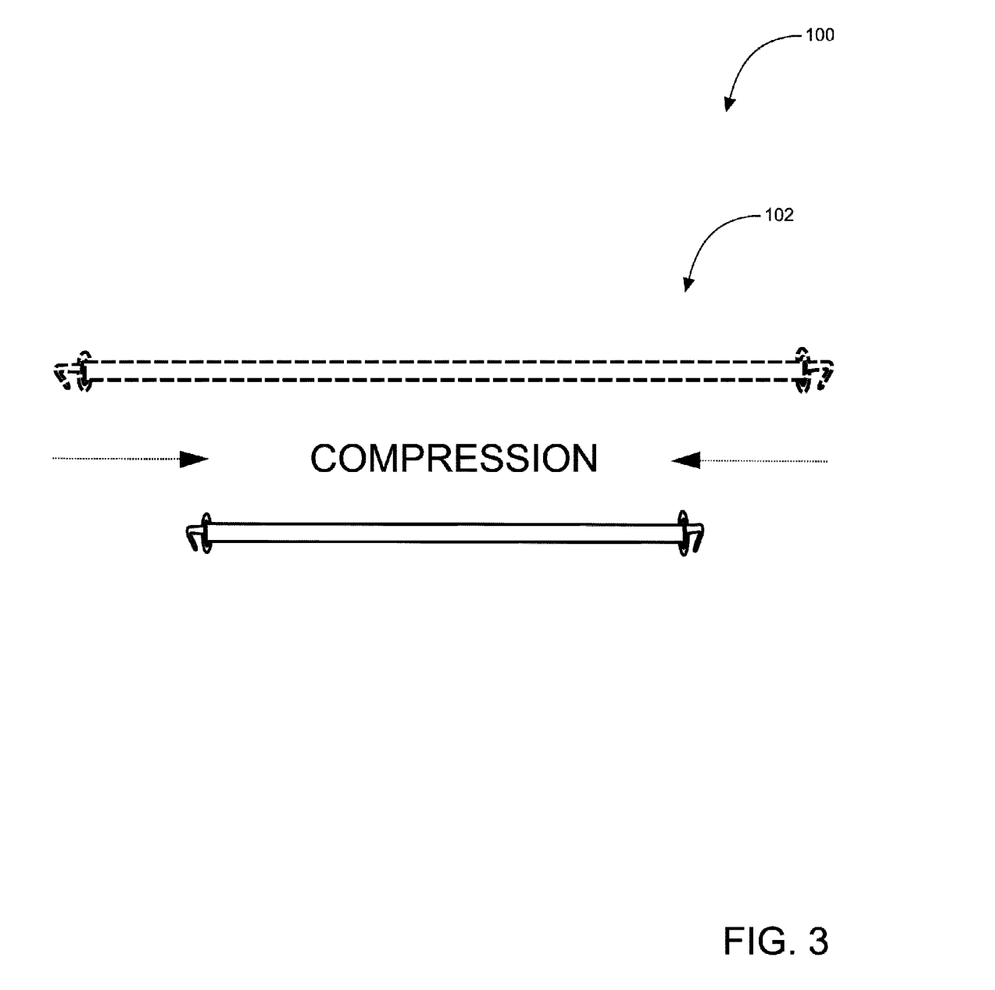
FIG. 3 is a perspective view illustrating a strap member assembly in compression and at rest of the tool (hooked strap member assembly) for enabling opening and closing a screen door of a recreation vehicle system according to an embodiment of the present invention.
Figure 4:
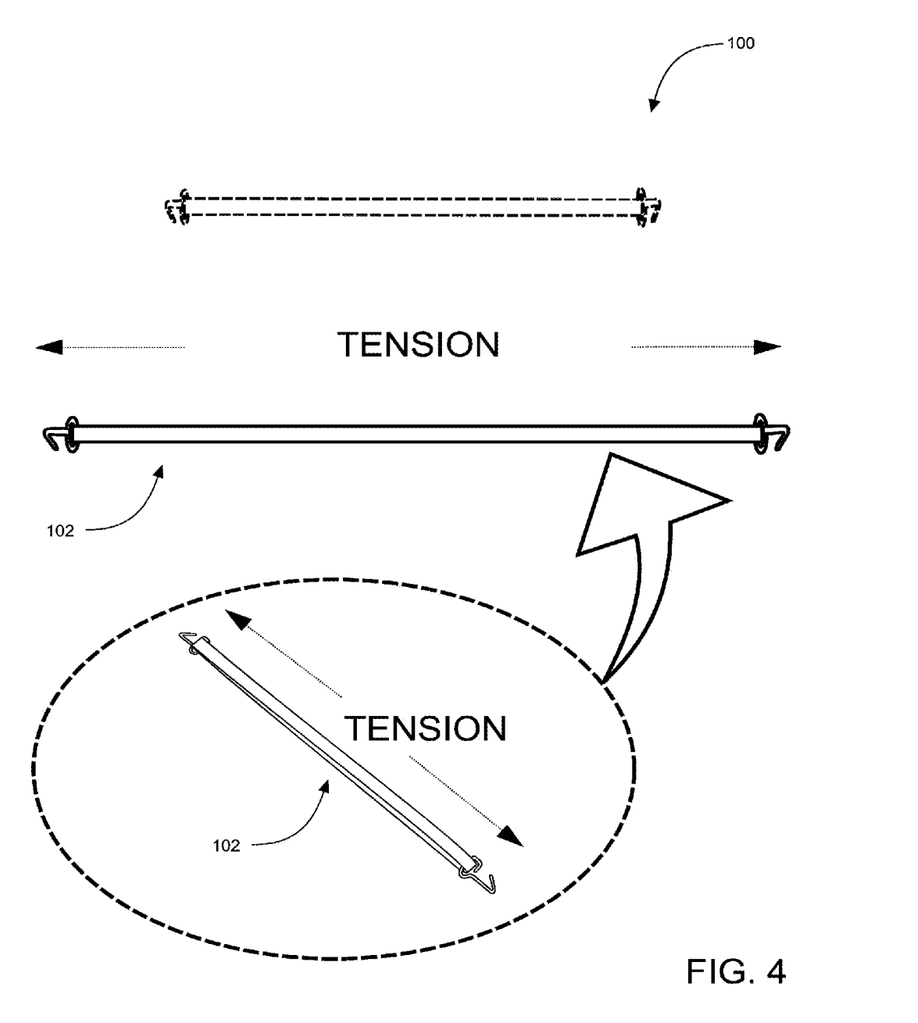
FIG. 4 is a perspective view illustrating the strap member assembly in tension of the tool for enabling opening and closing a screen door of a recreation vehicle system according to an embodiment of the present invention.

Strap member assembly 102 is structured and arranged to allow opening of slide-panel on screen door 182 of recreation vehicle 180 and when in tension provides that screen door 182 is able to be automatically closed when not held open as shown in open condition 106 of FIG. 1 and closed condition 200 of FIG. 2. When used strap member assembly 102 does not impede normal movement of screens (screen door 182) of recreation vehicle 180 while simultaneously enabling manipulation of screen door 182 between open position (open condition 106) to allow ingress and closed position (closed condition 200) to prevent bugs and debris from entering into recreation vehicle 180, as desired.

First flat-hooked member 120 is located on first end 110 being coupled to proximate end 140 of deformable strap 130. First flat-hooked member 120 is structured and arranged to be unobstructively hooked to bottom left corner of screen door access panel 190 of recreation vehicle 180 just above slide channel. First flat-hooked member comprises metal for strength, durability and weather-resistant properties. Upon reading this specification, it should be appreciated that, under appropriate circumstances, considering such issues as user preferences, design preference, structural requirements, marketing preferences, cost, available materials, technological advances, etc., other material arrangements such as, for example, plastic, hard rubber etc., may be sufficient.

First flat-hooked member 120 is approximately 1-inch in length to provide a sufficient holding means. First flat-hooked member 120 is V-shaped and comprises apex point 124. Apex point 124 on first flat-hooked member 120 forms an acute angle relative to deformable strap 130. First flat-hooked member 120 is structured and arranged to slide freely on access panel 190 of recreation vehicle 180 just above slide panel when sliding between open condition 106 and closed condition 200.

Deformable strap 130 is preferably flat thereby not impeding the opening and the closing of screen door 182. Deformable strap 130 is approximately 5/16-inches in width so as to not impede manipulation of screen door 182 from open condition 106 to closed condition 200. Deformable strap 130 is in compression when screen door 182 is in closed condition 200. Deformable strap 130 is approximately 1-inch in length when in the compression so as to not impede manipulation of screen door 182 from open condition 106 to closed condition 200. Deformable strap 130 is in extension and extends to double a resting length of deformable strap 130 when screen door 182 is in open condition 106.

Deformable strap 130 may comprises a rubber band for high tensile strength and deformability from tension back to compression. Upon reading this specification, it should be appreciated that, under appropriate circumstances, considering such issues as user preferences, design preference, structural requirements, marketing preferences, cost, available materials, technological advances, etc., other material arrangements such as, for example, elastic cords, etc., may be sufficient.

Second flat-hooked member 170 is located on second end 160 being coupled to distal end 150 of deformable strap 130. Second flat-hooked member 170 is able to be unobstructively hooked to outside edge of frame 188 on screen door 182. Second flat-hooked member 170 is approximately 3/16-inch in length and is V-shaped comprising acute apex point 174 relative to deformable strap 130. Second flat-hooked member 170 is structured and arranged to slide freely on the outside edge of frame 188 of screen door 182 of recreation vehicle 180 when sliding between open condition 106 and closed condition 200. Second flat-hooked member 170 comprises metal for providing sufficient strength, durability and weather-resistance. Upon reading this specification, it should be appreciated that, under appropriate circumstances, considering such issues as user preferences, design preference, structural requirements, marketing preferences, cost, available materials, technological advances, etc., other material arrangements such as, for example, plastic, hard rubber etc., may be sufficient.

Tool for enabling opening and closing a screen door of a recreation vehicle system 100 may be sold as a kit (not shown) comprising the following parts: plurality of strap member assemblies 102 in various colors, materials, and designs; and a set of user-instructions. Tool for enabling opening and closing a screen door of a recreation vehicle system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color/design/hook-strap combinations, parts may be sold separately, etc., may be sufficient.

Figure 5:
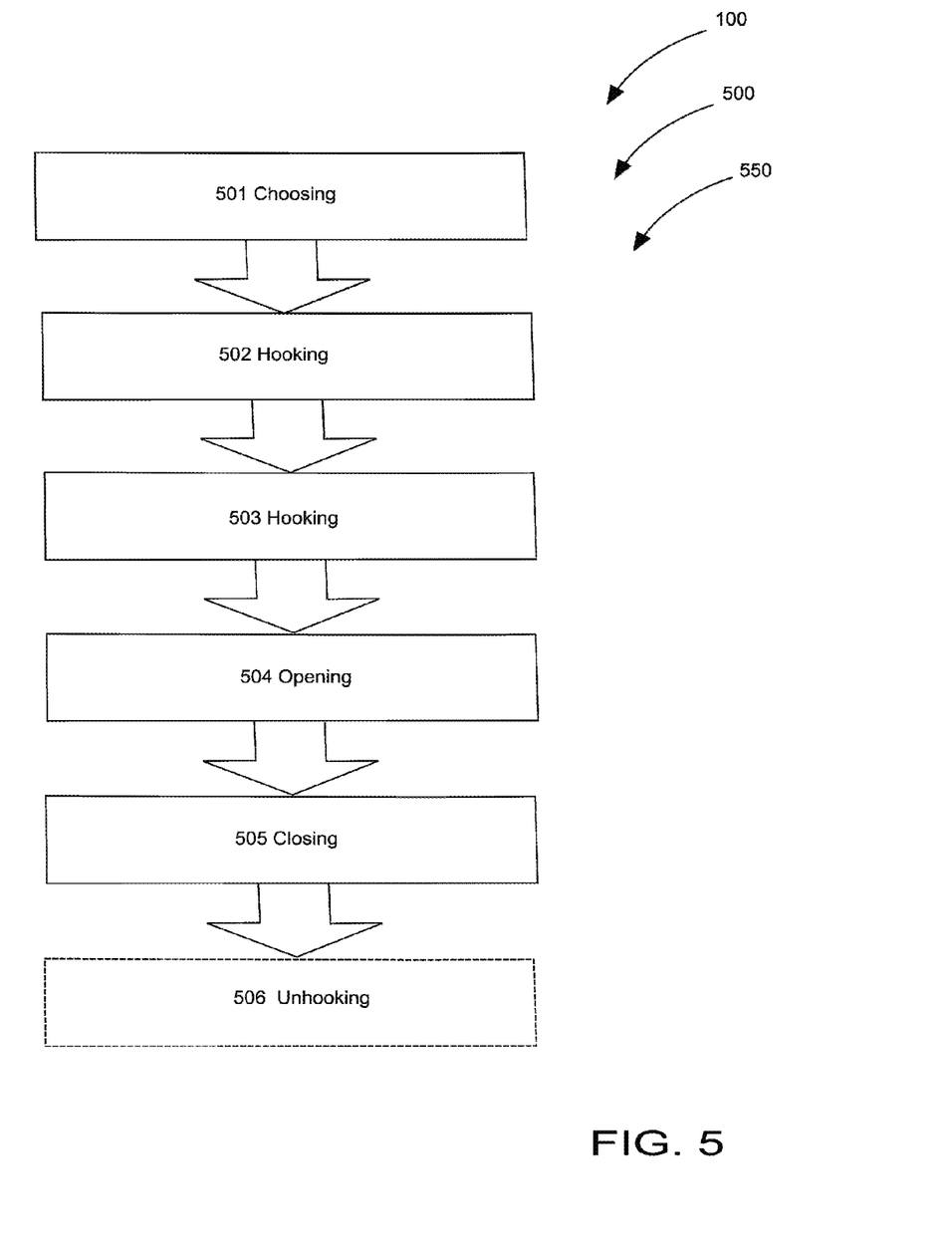
FIG. 5 is a flowchart illustrating a method of use for the hooked strap member assembly for enabling opening and closing a screen door of a recreation vehicle system according to an embodiment of the present invention of FIGS. 1-4.

Referring now to FIG. 5, flowchart 550 illustrating method of use 500 for tool for enabling opening and closing a screen door of a recreation vehicle system 100 according to an embodiment of the present invention of FIGS. 1-4.

Method of using 500 tool for enabling opening and closing a screen door of a recreation vehicle system 100 comprises the steps of: step one 501 choosing a strap member assembly 102 in a user-preferred color and material; step two 502 hooking first flat-hooked member 120 to bottom left corner of screen door access panel 190 of recreation vehicle 180 just above slide channel, first flat-hooked member 120 able to let a screen 182 pass thereby; step three 503 hooking second flat-hooked member 170 to an outside edge of frame 188 on screen door 182, second flat-hooked member 170 able to let a screen 182 pass thereby; step four 504 opening screen door 182; and step five 505 automatically closing screen door 182 once a user has entered or exited from recreation vehicle 180. The method further comprising the step of step six 506 unhooking first flat-hooked member 120 and second flat-hooked member 170 of strap assembly 102 from screen door 182 of recreation vehicle 180 for future use.

It should be noted that step 506 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A combination of a screen door having an access panel, and a tool for enabling biased closing a of said access panel, comprising:
   a screen door comprising:
      a main panel including;
         a frame; and
         a screen member comprising;
            a mesh material attached to said frame; and
            an aperture extending through said mesh material adapted to allow a person to extend their arm and hand therethrough;
         wherein said main panel is adapted to be pivotally connected to a doorway of a recreational vehicle to selectively open and close an opening therethrough;
      an access panel comprising:
         an access panel frame including;
            an upper edge portion having a slide channel extending the length thereof;
            an lower edge portion having a slide channel extending the length thereof;
            a left side portion connected between proximal ends of said upper and lower edge portions; and
            a right side portion connected between distal ends of said upper and lower edge portions;
            wherein said upper edge portion, said upper edge portion, said left side portion, and said right side portion forming an opening to allow access to said screen door aperture; and
            wherein said access panel frame is attached to said screen member surrounding said aperture; and
         an access panel door member;
            wherein said access panel door member extends between and is adapted to slide in a side-to-side fashion within said slide channels of said upper edge portion and said upper edge portion, such that said access panel door member selectively covers said opening to allow or deny access to said screen door aperture; and
   a tool comprising:
      a strap member assembly having:
         a first end including a first hook member;
         a stretchable strap having:
            a proximate end; and
            a distal end; and
         a second end having a second hook member;
      wherein said first hook member is coupled to said proximate end of said stretchable strap;
      wherein said second hook member is coupled to said distal end of said stretchable strap;
      wherein said strap member assembly is structured and arranged to allow sliding motion of said access panel to an open position allowing access to said screen door aperture, and when in said open position provides tension such that said access panel is adapted to be automatically closed when not held in said open position;
      wherein said first hook member is structured and arranged to be releasably hooked to a bottom left edge portion of said access panel door member in proximity to said slide channel of said lower edge portion of said access panel frame;
      wherein said second hook member is able to be releasably hooked to said right side portion of said access panel frame; and
      wherein said access panel door member is adapted to selectively cover said opening of said access panel frame.

2. The combination of claim 1 wherein said first and second hook members comprises metal for strength, durability and weather-resistant properties.

3. The combination of claim 1 wherein said first and second hook members comprises plastic for strength, durability and weather-resistant properties.

4. The combination of claim 1 wherein said first and second hook members are approximately 1-inch in length.

5. The combination of claim 1 wherein said first and second hook members are V-shaped.

6. The combination of claim 1 wherein said stretchable strap comprises an elastic cord.

7. The combination of claim 1 wherein said stretchable strap comprises a rubber band.

8. The combination of claim 7 wherein said stretchable strap is flat.

9. The combination of claim 8 wherein said stretchable strap is approximately 5/16-inches in width.

* * * * *